Aug. 8, 1967　　　R. J. BERGMAN　　　3,334,581
MOTORIZED SLIDE ADJUSTMENT
Filed June 17, 1965　　　　　　　　　　6 Sheets-Sheet 1

INVENTOR
ROLAND J. BERGMAN
by Albert L. Jeffers
attorney

Aug. 8, 1967   R. J. BERGMAN   3,334,581
MOTORIZED SLIDE ADJUSTMENT
Filed June 17, 1965   6 Sheets-Sheet 3

INVENTOR
ROLAND J. BERGMAN
by Albert L. Jeffers
Attorney

Aug. 8, 1967 R. J. BERGMAN 3,334,581
MOTORIZED SLIDE ADJUSTMENT
Filed June 17, 1965 6 Sheets-Sheet 5

INVENTOR
ROLAND J. BERGMAN
by Albert L. Jeffers
Attorney

Aug. 8, 1967       R. J. BERGMAN       3,334,581
MOTORIZED SLIDE ADJUSTMENT
Filed June 17, 1965                 6 Sheets-Sheet 6

INVENTOR.
ROLAND J. BERGMAN
BY
Albert L. Jeffers
ATTORNEY

United States Patent Office 3,334,581
Patented Aug. 8, 1967

3,334,581
MOTORIZED SLIDE ADJUSTMENT
Roland J. Bergman, Minster, Ohio, assignor to The Minster Machine Company, Minster, Ohio, a corporation of Ohio
Filed June 17, 1965, Ser. No. 464,662
15 Claims. (Cl. 100—257)

ABSTRACT OF THE DISCLOSURE

The shut height of a press is varied through a threaded connecting screw having a ball at one end which provides a pivotal connection to the press slide. A triple-crowned gear surrounds the ball, this gear being driven by the internal teeth of a ring gear which is driven by a worm engaging its external teeth. The worm may be connected to a calibrated indicator that shows the press shut height. The shut height is varied by rotating the worm, and hence varying the effective length of the threaded connecting screw. The triple-crowned gear permits the connecting screw and ball to the pivoted 360 degrees and still provide a strong drive connection.

---

This invention relates to a mortorized slide adjustment and more particularly to a slide adjustment in which the upper die in a press or the like is readily adjustable to preselected shut height position.

In a press, it is necessary to control the shut height in order to adapt the press for the inclusion of different dies. It is necessary when the press is fitted with different dies to recalibrate the shut height position in the upper slide housing and it is necessary to accomplish the calibration with a great deal of precision. Accuracy of the shut height adjustment is required within the order of about 1$\frac{1}{1,000}$ of an inch with tooling changes, and consequently considerable effect must be devoted to recalibrating the machine which contributes to operating expense and down time of expensive die machines and hence contributes to increased manufacturing costs.

It is an overall object of the present invention to provide a novel means for calibrating a press to a desired shut height in conjunction with a set of tools which are mounted within the press.

A further object of the present invention is to provide a calibrated indicator means which provides visual setting values for a shut height, these being matched with a given set of tools which are mountable in the press so that the press can be immediately adjusted by motorized means to a desired shut height calibrated for the selected tools.

It is still a further object of the present invention to provide a novel force connection which provides for limited angular movement between the driving and driven members and further embodies a gear connection for turning one of said universally movable members while maintaining unimpeded the universal movement between the driving and driven members.

One of the important features of the present invention is to provide a motorized means for setting a press with selected dies to a calibrated shut height so that such adjustment can be accomplished with minimum effort and in a negligible period of time so that the down period of the machine is reduced virtually to nothing, and said such shut height position is accurately obtainable to within 1$\frac{1}{1,000}$ of an inch which is well within the operating tolerance of the press.

The present invention also comprehends the important feature of quickly and reliably obtaining a given adjustment of the shut height to within a 1$\frac{1}{1,000}$ of an inch tolerance for a given set of dies and then maintaining such adjustment without loss or variation during operation.

Other objects and features will become apparent upon consideration of the following description which proceeds with reference to the accompanying drawings, wherein.

Figure 1:
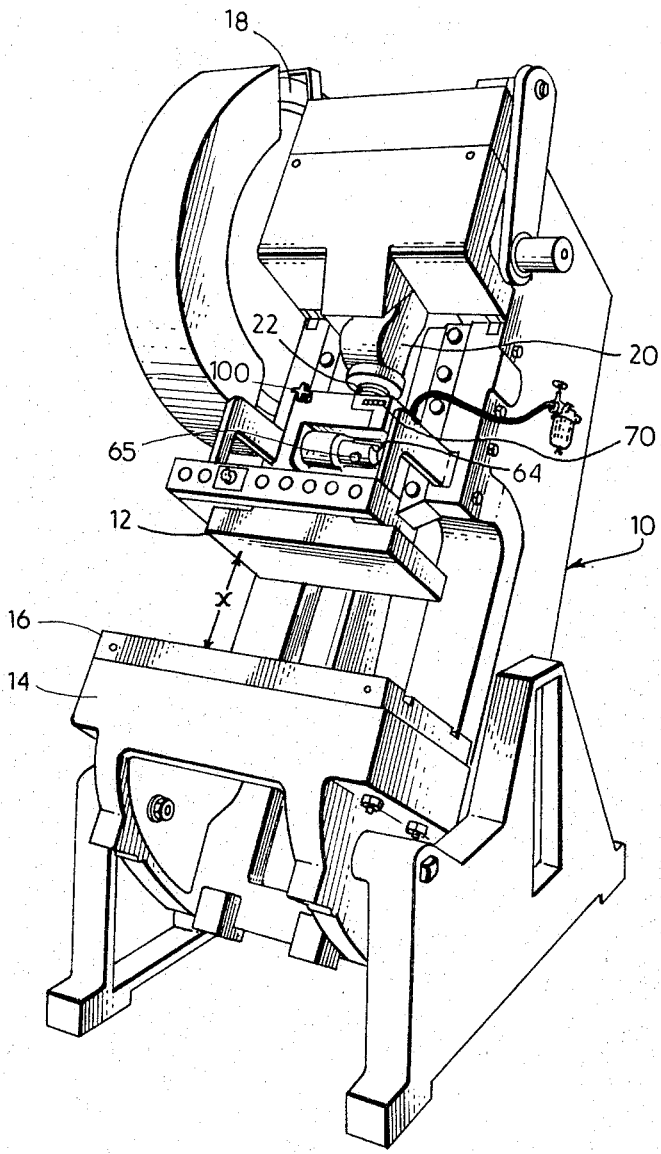
FIGURE 1 is an isometric view of a press embodying the present invention therein.

Referring now to the drawings, the press designated generally by reference numeral 10 includes an upper slide housing 12 and a relatively fixed bed 14 with a bolster plate 16 secured thereon. The press in FIGURE 1 has the dies omitted on the bolster plate and slide housing in order to illustrate the various features of the invention.

Figure 2:
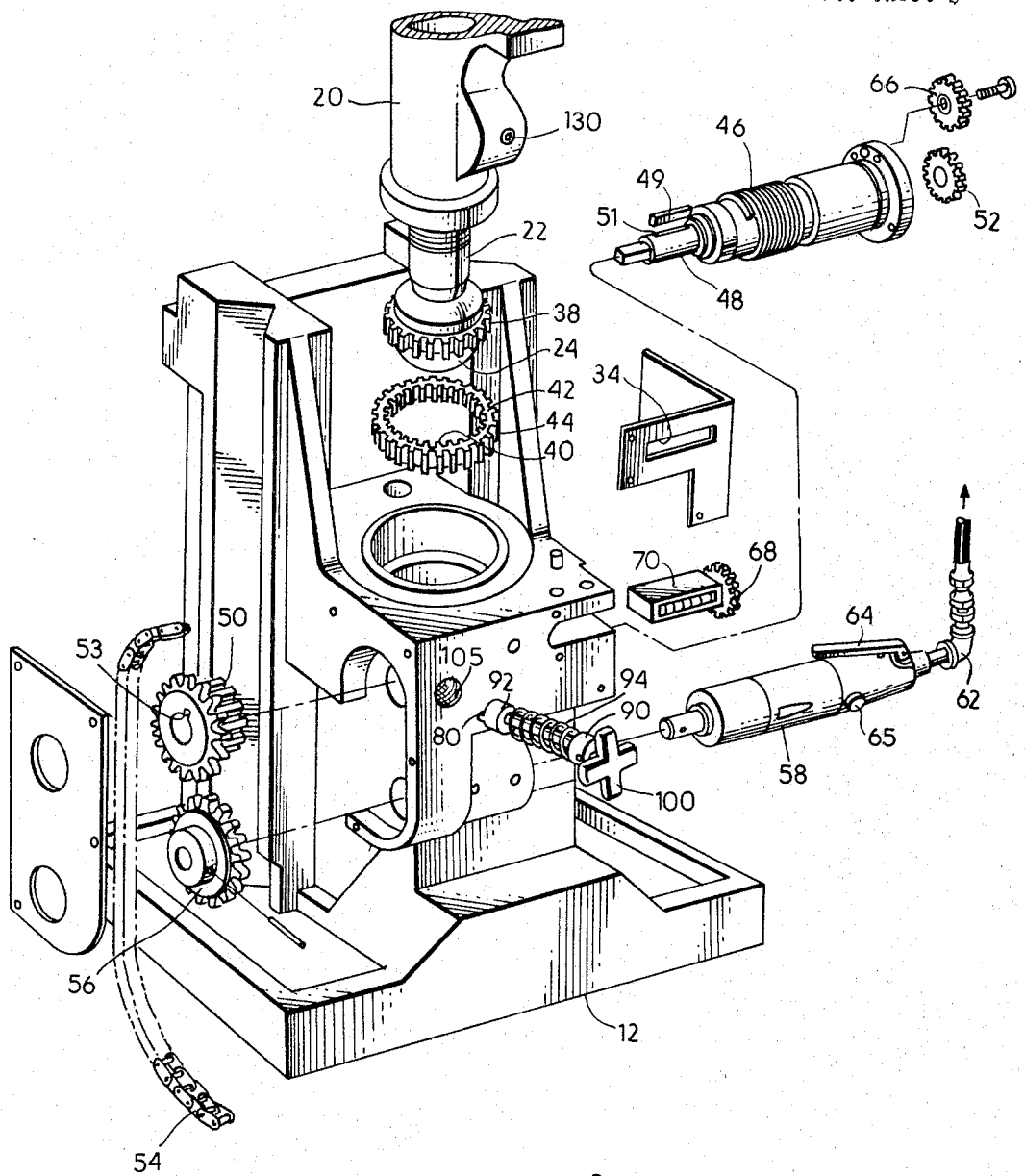
FIGURE 2 is an exploded view of the adjustment-and-calibrating structure of the invention, the structure being generally inclusive of the upper portion of the press in FIGURE 1.
Figure 3:
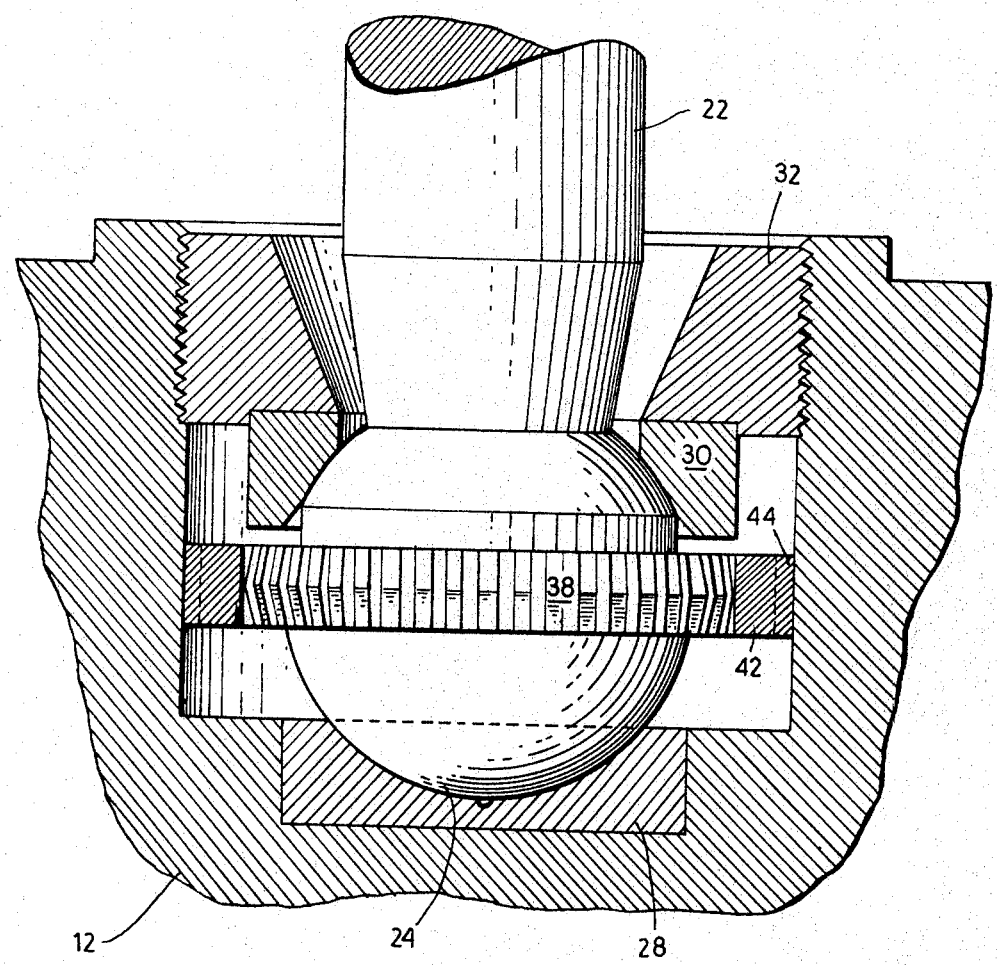
FIGURE 3 is an enlarged detail view illustrating the connection between the connection screw and slide housing.
Figure 4:
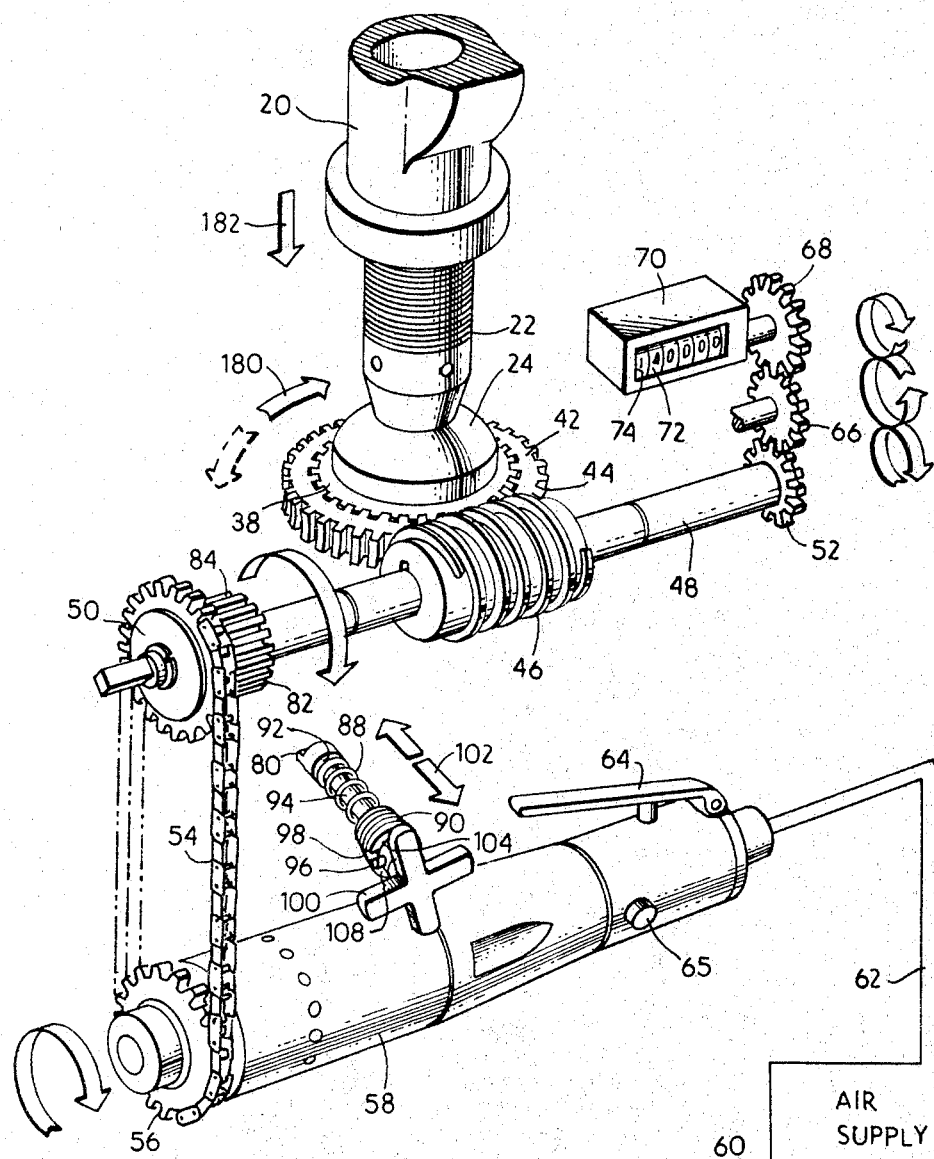
FIGURE 4 is a detailed perspective view of the operating and indicating means on the motorized slide adjustment.

The slide housing 12 is caused to reciprocate by a fly wheel 18 during its operation, such movement being accomplished by communicating fly wheel force from a crank arm and drive connection (not shown) to a reciprocable housing 20 which functions in the manner of a connecting rod. The housing 20 is internally threaded to receive a connection screw 22 having a ball 24 (FIGURES 2, 3, 4) which forms a universal swiveling connection with slide housing 12 (FIGURE 3). The connection between the ball 24 and housing is constituted by a slide bushing 28, a ball bushing 30 and a nut 32 which is a ball box adjustment clamping the ball bushing 30 and slide bushing 28 tightly against the opposed spherical sectors of the ball 24. The ball 24 is thus closely confined within the opposed concavely configured surfaces of the ball bushing 30 and slide bushing 28 but is nevertheless free to move universally therein so that the connecting screw 22 can move angularly, i.e., can rock back and forth as it reciprocates, carrying with it the slide housing 12.

The shut height position is designated generally by distance "X" (FIGURE 1) from the upper surface of the bolster plate 16. The shut height position can be regulated by adjusting the effective length of the connection screw 22 in the threaded opening within connecting rod housing 20. Since the stroke length of the press remains constant, the shut height position must be changed in relation to the tools and dies mounted upon the bolster plate 16 and slide housing 12 and this is accurately accomplished by suitably elongating or foreshortening the effective length of the connection screw 22 by turning it micrometic amounts to define the shut height position for the press.

It is an important feature of the present invention (see FIGURES 2, 3, 5, 6) that the drive connection between the slide housing 12 and the reciprocable connection screw 22 translates reciprocable movement to the slide housing and its attached tool (not shown) and yet permits a rocking movement between ball 24 and its socket connections 28, 30. In addition, there is further provided a motorized drive connection for turning the screw 22 and controlling its effective length which in turn defines the shut height position by varying the distance "X" (FIGURE 1). All of these described functions are carried out without interference with each other.

Figures 5, 6:
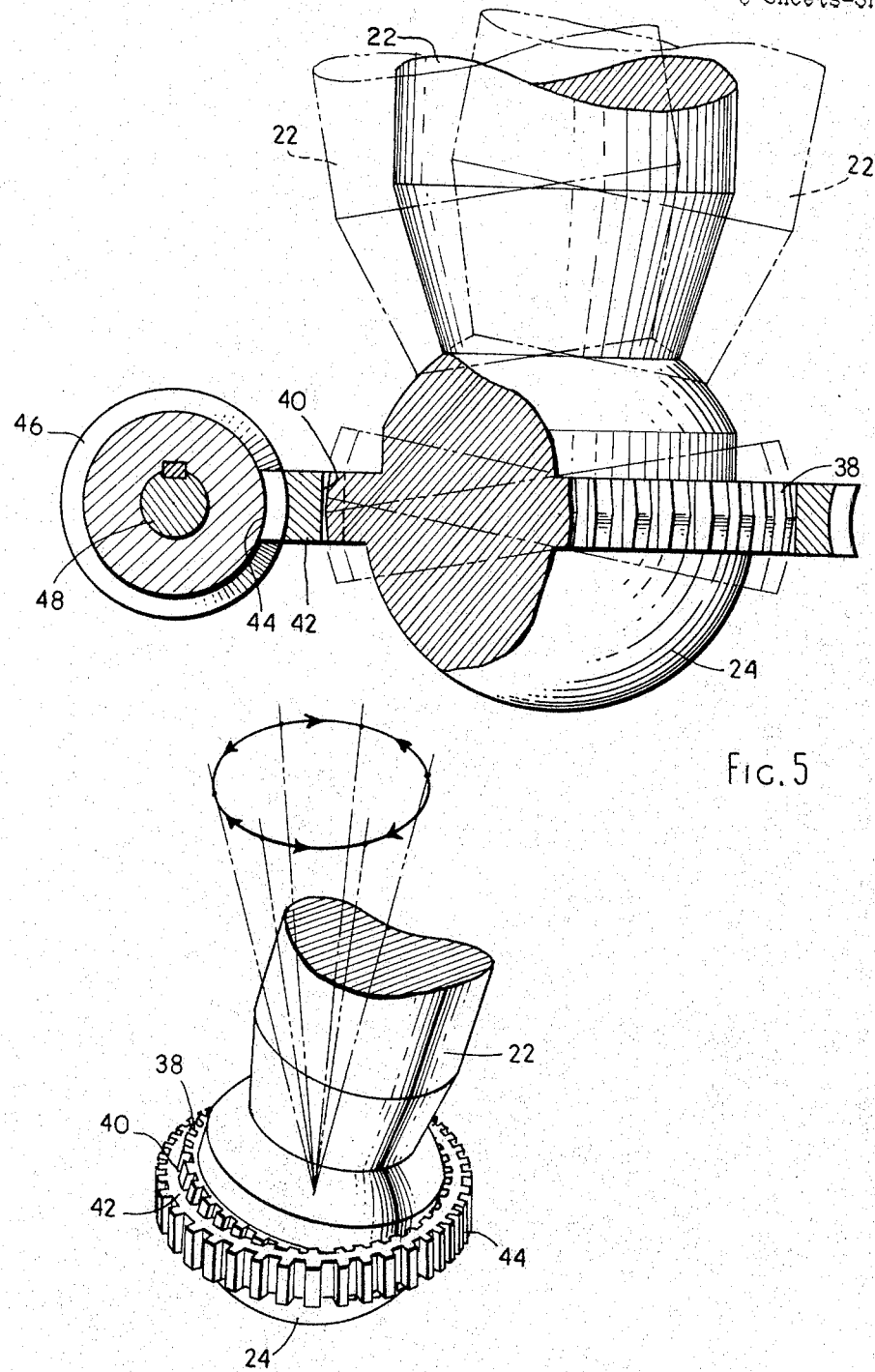
FIGURE 5 is an enlarged detail view of the connection between the worm gear and the lower end of the connection screw through its universal connection with the motorized drive.
FIGURE 6 is an enlarged isometric detail view showing the connection between the lower end of the connection screw and its associated ring gear, permitting the angular movement between the screw and slide housing indicated in FIGURE 5.

The ball 24 is surrounded by a triple-crowned set of hub teeth 38 (FIGURES 2, 5, 6) which are fixed to the ball 24 and configured so that the outer profile of the crown is tapered to a maximum circumference at the midsection of the gear teeth (FIGURE 5). The outer periphery of the gear teeth can be either convexly configured or tapered whichever is preferred. The triple-crowned teeth 38 mesh with the interior gear teeth 40 of a ring gear 42 having outer periphery gear teeth 44 which in turn mesh with worm gear 46.

Figure 7A:
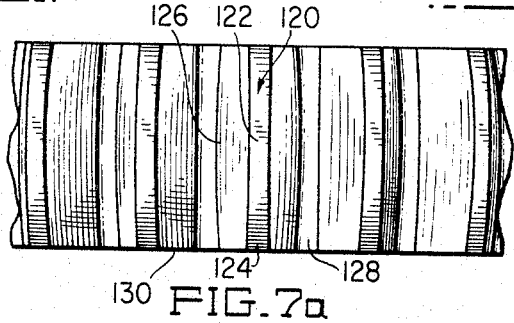
FIGURES 7a, 7b and 7c show top, side and cross-sectional views respectively of the triple-crowned teeth used in my invention.
Figure 7B:
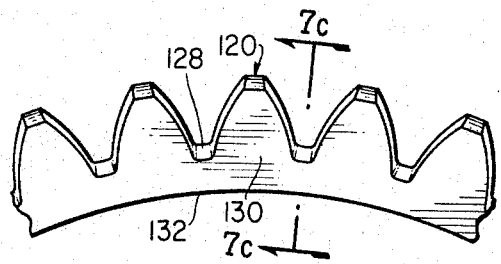
Figure 7C:
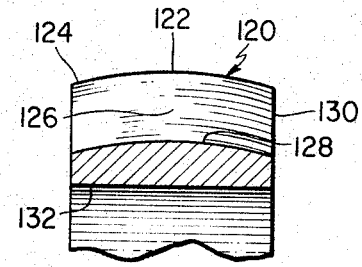

FIGURES 7a, 7b, and 7c show more detailed views of the triple-crowned teeth 38 but without the ball 24. FIGURES 7a and 7b are top and side views of the teeth, and FIGURE 7c is a cross-sectional view taken along a radius of the ring on which the teeth are positioned. In these figures, it will be seen that the top land 120 of each tooth is curved so that its outer portions 124 are lower and its central portion 122 is higher or crowned. This is one of the three crowns of each tooth. The other crowns are provided at the two central portions 126 of the two faces of each tooth. These central portions 126 have a greater thickness or dimension than the end portions adjacent the surfaces 130 of each tooth, as can be seen in FIGURES 7a and 7b. These two larger face dimensions provide the other two crowns for each tooth. The bottom land 128 is also preferably crowned as shown in FIGURE 7c. FIGURE 7c also shows the cross-sectional thickness of the ring structure on which the teeth are formed or mounted. This structure has an internal surface 132 which fits on or around the ball 24, and may be held by heating, fitting it to the ball 24. and then welding the two pieces together.

The worm gear 46 is keyed to a shaft 48 having sprocket 50 and gear wheel 52 at its opposite ends (FIGURE 4), the sprocket 50 being driven by a chain 54 connected with drive sprocket 56 actuated by a motor 58 driven from an air supply 60. The shaft 48 (FIGURE 2) is secured by a key 49 in keyway 51 to a slot 53 of sprocket 50. The air supply 60 is connected through a line 62 to the motor 58 and the motor is controlled by an integral valve operated through a manually controlled handle 64 which controls the extent of operation of the motor 58 and a reverse button 65 determines the direction of movement. The handle 64 and button 65 together determine the adjustment in the slide housing. The gear train is thus motorized and enables a power driving of the gears which produce adjustment of the shut height. The gear wheel 52 at the end of shaft 48 (FIGURE 4) is engaged with a transfer gear 66 which in turn is meshed with a calibration gear 68 connected to an indicator 70 having a plurality of indicia wheels 72 which are visible through opening 74. The indicia wheels provide a calibrated reading, geared to the extent of turning of the connection screw 22 such that the shut height "X" is directly readable by the indicia wheels. Thus, the shut height needed, for a given set of tools, is provided by a calibration reading given on the tools in accordance with a precalibration operation and the suitable shut height for that set of tools is then obtained by operating the handle 64 until the calibration reading on the tools is registered by the wheels 72 of indicator 70, at which point the shut height is obtained within a tolerance of 1½/1000 of an inch for the tools.

The adjustment provided in the shut height is obtained by the screw connection between screw 22 and crank arm housing 20 because the screw connection effectively lengthens and foreshortens, thereby raising and lowering the slide housing which is connected thereto in the manner indicated in FIGURE 3.

Turning of the screw 22 is effected by a combination of the worm gear 46, ring gear 42 and the triple-crowned gear wheel 38. It is an important feature of the present invention that this gear connection system permits angular or rocking movement between the slide housing 12 and the screw 22 (FIGURE 5), this rocking movement being inherent in the conversion of the rotary crank arm movement (not shown) at the upper end of the press to the reciprocating movement of the slide housing 12. The motorized gear connection (FIGURE 5) in no way interferes with this slight angular movement and the angular movement in turn does not disrupt the positive connection between the worm gear 46 and the triple-crowned gear 38 at the outer periphery of the ball 24. Thus, the motorized adjustment does not require a tolerance to provide for angular movement between the screw and the slide housing and the extent of turning of the motorized gear connection is thereby accurately calibrated to the shut height position and to the indicator 70.

Once the adjustment is secured, the worm gear 46 is prevented from further turning by a locking pawl 80 (FIGURE 4) which enters one of the spaces between the teeth 82 of a gear wheel 84 which is secured to the shaft 48 and prevents turning of the shaft 48 and worm gear 46. The pawl 80 is biased into a normal locking position with the gear 84 by a spring 88 which is compressed between threaded boss 90 and shoulder 92, forcing the stem 94 and pawl 80 to locking position until pin 96 bottoms in the slot 98. When it is desired to unlock the motorized gear train for adjustment, the handle 100 is pulled outwardly, in the direction of the arrow 102 (FIGURE 4), drawing with it the stem 94 which passes through opening 104 of the nut 90 threadedly received in a companion opening 105 (FIGURE 4) of the slide housing 12 and the pawl 80 is retained in retracted position by the pin 96 which, after being pulled out of the slot 98 is rotated by the handle 100 so that it will engage the outer annular shoulder 108. The extent of adjustable movement of the connection screw 22 is limited by engagement of a ball (not shown) but which is received through an opening 130 (FIGURE 2) of the connecting rod housing 20 and enters a track in the outer periphery of the threaded screw 22 to prevent threading and unthreading movements beyond prescribed limits. In this way the range of adjustment for the die set is effectively established.

In operation, the press is calibrated by accurately measuring with micrometers so that the distance between the lower face of the slide housing 12 and the upper face of the bolster plate 16 is accurate within 1/1000 of an inch. This is the shut height distance "X." The indicia wheels 72 are then set by disengaging the calibration gear 68 and giving it the calibrated shut height setting. The press is then equipped with a set of dies, tools or fixtures each having a factory set calibration which is provided at some suitable location thereon. The handle 64 is then operated until numerical value setting stated on the dies, tools or fixtures is read on the indicator 70. The press indicator and tools are calibrated so that the shut height is accurate to within 1½/1000 of the repuired operating distance and the press is then operated.

Once the shut height position is obtained, the motorized slide adjustment is locked by means of pawl 80 (FIGURE 4) which enters the space between the teeth of the gear wheel 84 locking the gear train (FIGURE 4) against further movement. As the press commences to operate, the slide housing 12 is raised and lowered by inertia wheel 18 which acts through the housing 20 and connection screw 22 which is connected to the slide housing 12 through ball connection 24 clamped between ball bushing 30 and slide bushing 28 (FIGURE 3). The rotary motion which is converted to the translational reciprocating movement of the slide housing through the connecting rod housing 20 and screw 22, necessitates approximately 10° of angular rocking movement indicated in FIGURE 5 by the solid and dotted line positions of the screw 22. This rocking is permitted by the triple-crowned gear teeth 38 at the outer periphery of the ball 24 which freely move angularly, relatively to the ring gear 42 which is constrained to rotary movement only and mesh at the inner periphery with gear teeth 38. The described angular movement occurs while maintaining a positive drive connection at all times betwen the respective meshing teeth of the triple-crowned gear 38, teeth 40 of ring gear 42 and teeth 44 of ring gear 42 with worm gear 46.

The worm gear 46 on shaft 48, being driven by the motor 58 through the chain 54 permits the operator to select whatever degree of turning of the screw 22 is necessary for obtaining a shut height distance "X" read directly from indicator 70 and calibrated for a given set of dies, tools or fixtures and marked with a numerical value which is duplicated at indicator 70. That is, the indicator 70 tells when the shut height is at the proper location and its reading corresponds with the reading on the tools mounted in the press at the position for which the tools are precalibrated for operation. The reading provides the required shut height within 1½₀₀₀ of the distance required for precise operation of the tool set selected for the press. All that is required therefore for a given change of die set including fixtures and tools is to mount the die set onto the slide housing and bolster plate and then operate the handle 64 after disengaging the locking pawl 80 to operate the gear train (FIGURE 4) turning the screw 22 in the direction of the arrow 180 to lower the slide housing in the direction of the arrow 182 and reduce the shut height "X" or to reverse motor 58 and rotate the gear train in the opposite direction reversing the direction of turning of the ring gear 42 from the direction of the arrow 180 and raising the connection screw 22 in a direction opposite that of 182 and increasing the shut height distance "X." Regardless of the direction of actuation of the gear train, the operator is merely required to operate the handle 64 in such a direction and amount as to read from the indicator 70 whatever figure is found on the tools installed and automatically there is provided a calibrated shut height distance "X" which is accurate within ⅟₁₀₀₀ of an inch the distance required for proper operation of the press with such tools.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

I claim:

1. In a press, apparatus for setting shut height, comprising: a slide housing adapted for reciprocable movement within said press, reciprocable means including a drive connection with said reciprocable slide housing for effecting movement thereof and having an adjustable threaded connection which defines the shut height for said slide housing, and means for adjustably operating said threaded connection, said operating means including a triple-crowned tooth gear fastened to said reciprocable means, and a ring gear rotatably positioned in said housing and in engagement with said triple-crowned tooth gear for effecting turning of said reciprocable means to operate said adjustable connection which defines the operative position of said slide housing while providing also for angular movement between said slide housing and said reciprocable means substantially unimpeded by said triple-crowned gear tooth connection.

2. In a press, apparatus for setting shut height, comprising: a slide housing adapted for reciprocable movement within said press and having a position in accordance with a predetermined shut height, reciprocable means including a drive connection with said reciprocable slide housing for effecting movement thereof and having an adjustable threaded connection which defines the shut height for said slide housing, means for adjustably operating said threaded connection including a triple-crowned gear tooth connection between said reciprocable means and said slide housing for effecting turning of said reciprocable means to operate said adjustable connection and to define the operative position of said slide housing, said triple-crowned gear tooth connection also providing for substantially unimpeded angular movement between said slide housing and said reciprocable means, and motorized means for actuating said triple-crowned gear connection to effect controllable turning thereof and thereby to operate said adjustable connection.

3. Apparatus for setting the shut height within a press or the like, comprising: a slide housing adapted for reciprocable movement within said press, reciprocable drive means for operating said slide housing and having an adjustable threaded connection with said slide housing to define its shut height position, means for adjustably operating said threaded connection to control the effective length of said reciprocable drive means and its attached slide housing, said operating means including a pair of circular gears meshed about their circumferences to provide a fixed rotary relation but pivotal movement therebetween, and indicator means operatively connected to said gears and actuable thereby to provide a quantitative reading of the shut height.

4. In a press, apparatus for adjusting the shut height, comprising: an upper slide housing disposed in said press for movement therein, a reciprocable drive means having a universal connection with said slide housing to operate said slide housing, adjustably elongatable means in said reciprocable drive means for regulating the shut height of the slide housing connected thereto, and means for operating said elongatable threaded connection, including a triple-crowned gear connection for turning said reciprocable drive means and providing angular movement of said reciprocable means on its universal connection with said slide housing.

5. In a press, apparatus for adjusting the shut height, comprising: an upper slide housing disposed in said press, a reciprocable drive means having a universal connection with said slide housing to operate said slide housing, adjustably threaded means in said reciprocable drive means for regulating the shut height of the slide housing connected thereto, and means for operating said threaded means including a triple-crowned gear connection for turning said reciprocable drive means and providing angular movement of said reciprocable drive means on its universal connection with said slide housing, and an indicator means which is concurrently operable with the triple-crowned gear connection to indicate the shut height of said slide housing.

6. A force transmitting connection, comprising: a ball-and-socket forming a thrust connection, a gear surrounding the ball portion of said connection and operatively connected thereto for effecting turning of said ball and having triple-crowned gear teeth in the outer periphery of said gear, and a torque transmitting gear wheel interconnected with said triple-crowned gear teeth for effecting turning of the ball within its associated socket and concurrently permitting pivotal movement between said gear teeth and gear wheel as the ball turns angularly within its socket.

7. A force transmitting connection, comprising: a ball-and-socket forming a thrust connection, a gear surrounding the ball portion of said connection and operatively connected thereto for effecting turning of said ball, said gear having triple-crowned teeth in the outer periphery thereof, a torque transmitting gear wheel interconnected with said triple-crowned gear teeth for effecting turning of the ball within its associated socket and concurrently permitting pivotal movement between said gear teeth and gear wheel as the ball turns angularly within its socket, and an indicator means operatively connected with said gear wheel to provide a calibrated reading of the degree of turning effected by said gear wheel of said interconnected crowned gear teeth.

8. A force transmitting connection, comprising: a ball-and-socket forming a thrust connection, a gear surrounding the ball portion of said connection and operatively connected thereto for effecting turning of said ball and having a triple-crowned gear teeth in the outer periphery of said gear, a torque transmitting gear wheel interconnected with said triple-crowned gear teeth for effecting turning of the ball within its associated socket and concurrently providing pivotal movement between said gear teeth and gear wheel as the ball turns angularly within its socket, an indicator means operatively connected with said gear wheel to provide a calibrated reading of the degree of turning effected by said gear wheel of said interconnected crowned gear teeth, and manually controlled power operating means for driving said gear wheel in one or the other direction to provide a degree of angular turning of said gear wheel through an amount indicated by said indicator means.

9. In a mechanism for transmitting rotary motion of a crank into longitudinal motion of a slide, the improvement comprising: an elongated member threaded at one end for connection to said crank; a ball attached to the other end of said elongated member; a circular gear attached to said ball, said gear having teeth around its outer circumference that are triple-crowned and that extend around said ball in a circle lying in a plane that is substantially perpendicular to the longitudinal axis of its said elongated member; a slide pivotally fastened to said ball, said slide having a socket that operatively engages portions of said ball so that motion of said elongated member is transmitted to said slide; a ring gear carried for rotation within said slide, said ring gear having teeth around its inner circumference that engage said teeth of said circular gear and having teeth around its outer circumference to be driven by drive means; and means mounted on said slide for driving said ring gear through said teeth around the outer circumference of said ring gear so that said circular gear, said ball, and said elongated member are rotated about said longitudinal axis for changing the effective length of said elongated member and at the same time permitting pivotal motion of said elongated member relative to said slide.

10. The improvement of claim 9 wherein said driving means comprises a worm rotatably mounted on said slide in engagement with said teeth around the outer circumference of said ring gear.

11. The improvement of claim 9 wherein each of said triple-crowned teeth is crowned at the center of its top land and at the center of its two faces.

12. The improvement of claim 11 wherein said driving means comprises a worm rotatably mounted on said slide in engagement with said teeth around the outer circumference of said ring gear.

13. In a press having a reciprocable housing driven by a crank and a slide to be driven by said reciprocable housing, an improved device for connecting said slide to said reciprocable housing comprising:
   (a) an elongated connection having a longitudinal axis and a threaded portion at one end for threadedly engaging said reciprocable housing;
   (b) a generally circle ball fastened to the other end of said elongated connection, said ball being adapted to fit in a socket in said slide for transmitting motion from said elongated connection to said slide;
   (c) a set of gear teeth circularly positioned around a circumference of said ball, said circumference lying in a plane substantially perpendicular to said longitudinal axis, said teeth having their face width dimensions substantially parallel to said longitudinal axis, and each of said gear teeth being crowned at the center portion of its top land and at the center portion of each of its two faces;
   (d) a circular ring gear having internal teeth and external teeth, said circular ring gear being adapted to be rotatably mounted in a fixed position on said slide, said internal teeth being arranged to engage said gear teeth on said ball and transmit rotational motion thereto and to permit said gear teeth on said ball and said elongated connection to pivot relative to said circular ring gear;
   (e) and means adapted to be mounted on said slide for engaging said external gear teeth on said ring gear and transmit rotary motion to said ring, to said gear teeth on said ball, and to said elongated connection for threading said elongated connection into and out of said reciprocable housing and changing the effective length of said elongated connection.

14. The improved device of claim 13 wherein said means for transmitting rotary motion to said ring gear comprises a worm.

15. The improved device of claim 14 and further comprising means for indicating the revolutions of said worm.

References Cited

UNITED STATES PATENTS

| | | | |
|---|---|---|---|
| 1,749,398 | 3/1930 | Strout | 100—257 |
| 2,198,333 | 4/1940 | Freeman. | |
| 2,465,734 | 3/1949 | Lewin | 74—586 |
| 2,687,025 | 8/1954 | Wildhaber | 64—9 |
| 2,818,798 | 1/1958 | Deykin | 100—257 |
| 2,946,234 | 7/1960 | Jahnke | 83—527 X |
| 3,013,411 | 12/1961 | Wahlmark | 64—9 X |
| 3,142,972 | 8/1964 | Spaulding | 64—7 |
| 3,162,232 | 12/1964 | Munschauer et al. | 100—257 X |

BILLY J. WILHITE, *Primary Examiner.*